W. G. & C. E. PEET.
FLUSHING VALVE.
APPLICATION FILED MAR. 6, 1914.
1,115,100.
Patented Oct. 27, 1914.
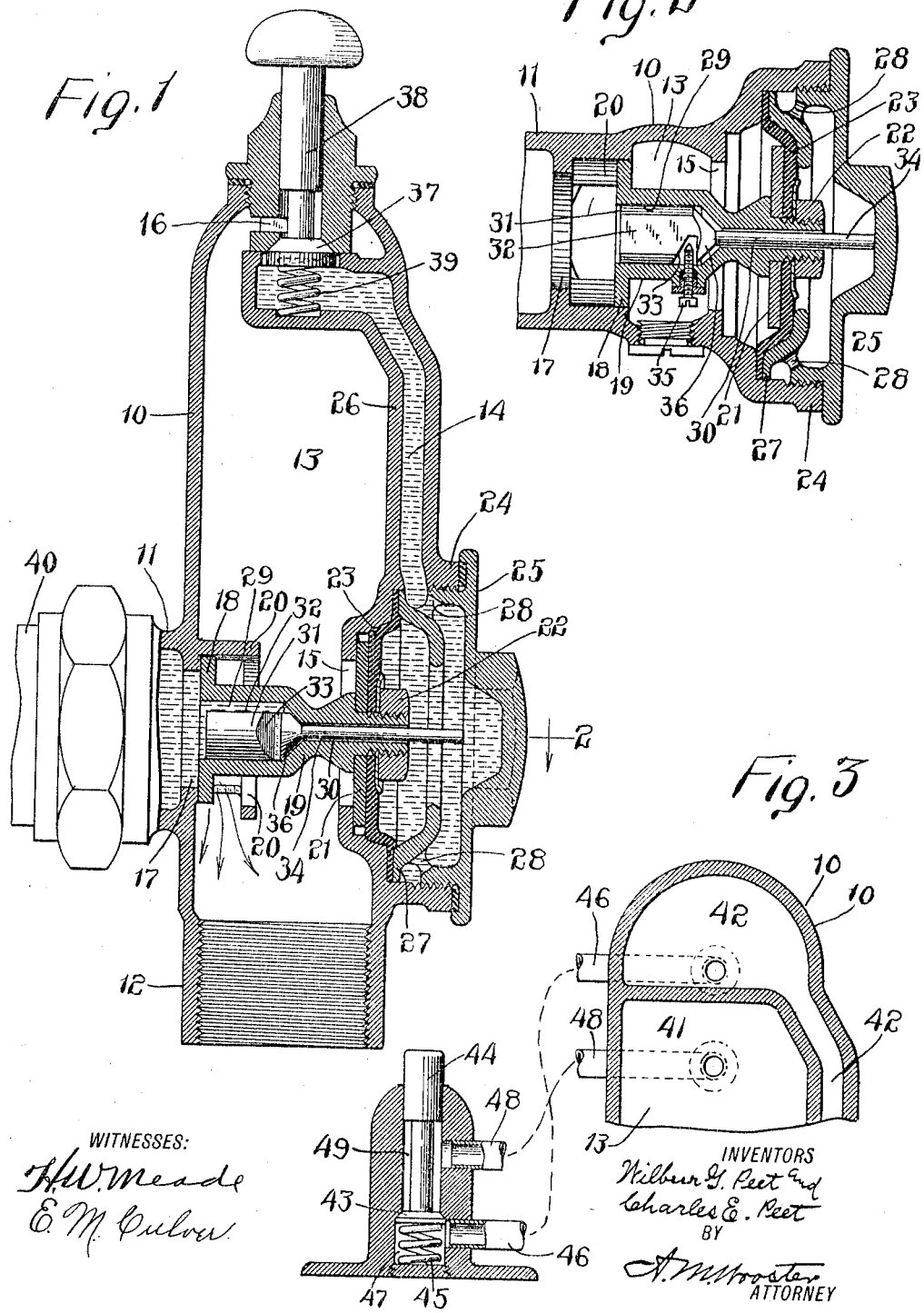

UNITED STATES PATENT OFFICE.

WILBUR G. PEET AND CHARLES E. PEET, OF BRIDGEPORT, CONNECTICUT, ASSIGNORS OF ONE-FOURTH TO JAMES F. TORRANCE, OF DERBY, CONNECTICUT.

FLUSHING-VALVE.

1,115,100.  Specification of Letters Patent.  Patented Oct. 27, 1914.

Application filed March 6, 1914. Serial No. 822,841.

*To all whom it may concern:*

Be it known that we, WILBUR G. PEET and CHARLES E. PEET, citizens of the United States, residing at Bridgeport, county of Fairfield, State of Connecticut, have invented an Improvement in Flushing-Valves, of which the following is a specification.

This invention relates to the class of flushing valves for water-closets and similar uses, which are attached to the supply pipe and flush directly from the supply pipe without the use of a tank, and has for its object to simplify and cheapen the construction and to greatly improve the operation in use.

With these and other objects in view we have devised the novel valve which we will now describe, referring to the accompanying drawing forming a part of this specification and using reference characters to indicate the several parts.

Figure 1 is a longitudinal section of our novel flushing valve complete; Fig. 2 is a transverse section on the line indicated by 2 in Fig. 1, and Fig. 3 is a sectional view illustrating a modified form in which the operating plunger is detached from the valve.

10 denotes the body which may be of any preferred shape or configuration and is provided with a hub 11 for the attachment of a supply pipe 40 and a hub 12 for the attachment of a flushing pipe, not shown. Within the body are a chamber 13 and a passage 14, one end of which communicates with the chamber at opening 16. Water passes from the supply pipe to the chamber through an opening 17 which is controlled by a service valve 18 having a tubular stem 19 which passes through an opening 15 in the wall 26 separating the passage from the chamber.

20 denotes a guide for valve 18 shown as cast integral with the body.

At the opposite end of stem 19 from valve 18 is a backing plate 21 which is adapted to engage the portion of wall 26 surrounding opening 15. Contiguous to plate 21 and secured to the stem in any suitable manner, as by a nut 22, in a diaphragm 23, which may be made of any suitable flexible material, as rubber or leather or of light flexible metal, the plate serving as a backing for the diaphragm.

The body is provided with a hub 24 having a relatively large opening, for the purpose of assembling the parts, said opening being closed by a screw cap 25. The diaphragm is secured in place by being clamped between wall 26 and a circular flange 27 on the screw cap. The special construction of the screw cap is not of the essence of the invention. Openings 28 are provided which permit water to pass freely through the screw cap and into the passage. Stem 19 is provided with a recess 29 and with a hole 30 extending from the recess through the stem. Lying within the recess is a valve 31 provided with a cut-away portion 32 to permit passage of water and with a recess having an incline 33 for a purpose presently to be explained. The inner end of the valve is preferably made cone-shaped, as at 36, and the inner end of recess 29 in the stem is made cone-shaped to correspond therewith, so as to control the passage of water. A rod 34 which forms a continuation of the valve extends loosely through the hole in the stem and is adapted to engage the inner face of the screw plug, as in Fig. 2, when valve 18 is in the open position. The object of this engagement is to permit sufficient longitudinal movement of the stem independently of the rod to dislodge sediment or vegetable matter and prevent its accumulation in the hole.

35 denotes an adjusting screw in the stem, the end of which is adapted to engage incline 33 for the purpose of adjusting the cone-shaped end of the plug relatively to the cone-shaped inner end of the recess in the stem, for the purpose of controlling the passage of water through the hole.

The flow of water from the passage into the chamber is controlled by a controlling valve 37 carried by a plunger 38. The plunger is held in the raised position and the valve in engagement with its seat by means of a spring 39, as in Figs. 1 and 3.

It will of course be understood that these details of construction may be greatly varied without departing from the principle of the invention.

The operation is as follows: Water from the supply pipe normally flows through stem 19 and fills passage 14. To flush, the operator presses the plunger inward against the power of the spring. As soon as controlling valve 37 is opened, water will rush from the passage into the chamber and relieve the pressure in the passage, which has been holding service valve 18 closed. The pressure of water in the supply pipe will now open the service valve and permit water from the supply pipe to pass freely into the chamber and out through the flushing pipe (not shown) which is attached to hub 12. The flow of water from the supply pipe will continue until sufficient water has passed through the stem and into passage 14 to overcome, through its action upon the diaphragm, the service pressure in the supply pipe. It will be noted that the area of the diaphragm is much greater than the area of opening 17 leading from the supply pipe into the chamber. Consequently, as soon as the normal service pressure is reached in the passage the diaphragm and the service valve will be moved from the position shown in Fig. 2 to the position shown in Fig. 1, it being understood of course that spring 39 is sufficiently strong to close the controlling valve the instant the pressure upon the plunger is relieved. The duration of the flushing operation is therefore, owing to the much greater area of the diaphragm than opening 17, a matter of restoring service pressure in the passage, the interior recess in the screw cap being, for all practical purposes, a portion of the passage, as the flow of water is unimpeded. Just when service pressure will be reached in the passage, and consequently the duration of the flushing operation, will depend upon the adjustment of screw 35. If this screw is turned backward, the cone-shaped end of the valve will be moved, by the service pressure, closer to the cone-shaped inner end of the recess in the stem and consequently the flow of water through the stem will be reduced, and the duration of the flushing operation increased. By turning screw 35 inward the plug will be forced backward away from the base of the recess in the stem and the flow of water through the stem will be correspondingly increased and the duration of the flushing operation lessened.

In the form illustrated in Fig. 3 the plunger and controlling valve are detached from the valve body, necessitating a re-arrangement of the parts but without changing the principle of the invention. 41 denotes the chamber, 42 the passage, 43 the controlling valve, 44 the plunger and 45 the spring. A pipe 46 connects the passage with a chamber 47 below the controlling valve and a pipe 48 connects chamber 41 with a chamber 49 above the controlling valve. When the plunger is operated water will pass from passage 42 through pipe 46 to chamber 47 then past controlling valve to chamber 49 and through pipe 48 to chamber 41 in the valve body. This relieves the pressure of water upon the diaphragm (not shown) as before and the service pressure of water in the service pipe opens the service valve (not shown) as before.

Having thus described our invention we claim:

1. A structure of the character described, comprising a chamber, a passage adapted to communicate therewith, means to control the flow of water from the passage to the chamber, a movable service valve controlling the entrance of service water to the chamber and having a stem provided with a recess and hole leading from the recess into the passage, a diaphragm connected with the stem and disposed between the chamber and passage, and a plug arranged in the recess and movable therein and having a rod passing through said hole and extending into the passage for a suitable distance to engage the wall of the passage to automatically shift the plug with relation to the stem when the service valve is moved to the open position.

2. A structure of the character described comprising a chamber, a passage adapted to communicate therewith, means to control the flow of water from the passage to the chamber, an inwardly opening service valve controlling the entrance of service water into the chamber and having a tubular stem, a diaphragm connected with the stem and secured between the chamber and the passage, a valve in the stem having a rod extending through the stem and adapted to engage the wall of the passage when the service valve is opened and permitting movement of the stem independently of the rod, and adjustable means to regulate the extent of movement of the valve in the stem with relation thereto.

3. A structure of the character described comprising a chamber, a passage opening into said chamber, a valve controlling the flow of water from the passage to the chamber, a service valve controlling the entrance of service water to the chamber, a stem for said service valve having a recess and a hole leading from said recess into the passage, a diaphragm connected to the stem and secured intermediate the chamber and the passage, a plug in the recess having an incline and an adjusting screw engaging said incline for regulating the flow of water through the stem to the passage.

4. A structure of the character described comprising a chamber, a passage opening into said chamber, a valve controlling the flow of water from the passage to the chamber, a service valve controlling the entrance of service water to the chamber, a stem for said service valve having a recess and a hole leading from said recess into the passage, a diaphragm connected to the stem and secured intermediate the chamber and the passage, a plug in said recess having a rod extending through the hole and adapted to engage a fixed portion of the structure, on the opening movement of the valve, and means for adjusting the plug to control the flow of water through the hole.

5. In a structure of the character described, a chamber, a passage adapted to communicate therewith, means to control the passage of water from the passage into the chamber, a movable service valve to control the passage of service water into the chamber and having a tubular stem communicating with the passage, a valve movably mounted within the tubular stem to control the passage of water from the chamber into the passage and having an incline, an adjustable element carried by the tubular stem and arranged to engage the incline, pressure operated means to move the service valve to its closed position, and means to open the second-named valve when the service valve is moved to the open position.

6. In a structure of the character described, a substantially vertical chamber, a longitudinal passage starting near the lower end of the chamber and leading into the same at the upper end thereof, means to control the passage of water from the passage to the chamber, a horizontal valve-guide arranged upon the interior of the chamber near the lower end thereof, a horizontally movable service valve arranged within the valve-guide to control the passage of service water into the chamber, a tubular stem connected with the service valve and leading into the passage, a diaphragm secured to the tubular stem and arranged between the passage and chamber, and a valve arranged within the tubular stem with a rod extending beyond the stem to engage the wall of the passage in one position of the valve, substantially as described.

7. In a structure of the character described, a chamber, a passage adapted to communicate therewith, means to control the flow of water from the passage to the chamber, a service valve to control the supply of service water to the chamber, a tubular stem attached to the service valve and adapted to supply water to the passage and provided with a valve seat, a valve in the stem, adjustable means to limit the movement of said valve relatively to the seat, pressure operated means to move the stem in one direction to close the service valve and a rod secured to the valve in the stem and adapted to engage the wall of the passage and permit longitudinal movement of the stem independently of the rod.

8. In a structure of the character described, the combination with a body having a chamber and a passage leading into said chamber, of a service valve controlling the entrance of service water to the chamber and provided with a stem extending into the passage and having a recess cone-shaped at its inner end and a hole extending from said recess through it, a diaphragm connected to the stem and secured intermediate the chamber and the passage, a plug in the recess cut away on one side, cone-shaped at its inner end and having a rod extending through the hole and means for adjusting the plug in the recess to control the flow of water through the hole.

9. In a structure of the character described, the combination with a body having a chamber and a passage leading into said chamber, of a service valve controlling the entrance of service water to the chamber and provided with a stem extending into the passage and having a recess and a hole extending from the recess through it, a diaphragm connected to the stem and secured intermediate the chamber and the passage, a plug in the recess having an incline and a rod extending through the hole, and a set screw engaging the incline whereby the plug is adjusted to control the flow of water through the hole.

In testimony whereof we affix our signatures in presence of two witnesses.

WILBUR G. PEET.
CHARLES E. PEET.

Witnesses:
FREDERICK H. COGSWELL,
CLARENCE H. HALL.

Copies of this patent may be obtained for five cents each, by addressing the "Commissioner of Patents, Washington, D. C."